(12) United States Patent
Ma et al.

(10) Patent No.: US 10,267,292 B2
(45) Date of Patent: Apr. 23, 2019

(54) WIND TURBINE AND OPERATIONAL CONTROL METHOD AND DEVICE THEREFOR

(71) Applicant: BEIJING ETECHWIN ELECTRIC CO., LTD., Beijing (CN)

(72) Inventors: Lei Ma, Beijing (CN); Qingjiang Li, Beijing (CN); Shijun Liu, Beijing (CN)

(73) Assignee: BEIJING ETECHWIN ELECTRIC CO., LTD., Beijing (CN)

(*) Notice: Subject to any disclaimer, the term of this patent is extended or adjusted under 35 U.S.C. 154(b) by 0 days.

(21) Appl. No.: 15/580,126

(22) PCT Filed: Mar. 20, 2017

(86) PCT No.: PCT/CN2017/077316
§ 371 (c)(1),
(2) Date: Dec. 6, 2017

(87) PCT Pub. No.: WO2017/181798
PCT Pub. Date: Oct. 26, 2017

(65) Prior Publication Data
US 2018/0298880 A1 Oct. 18, 2018

(30) Foreign Application Priority Data
Apr. 20, 2016 (CN) .......................... 2016 1 0248976

(51) Int. Cl.
*F03D 9/00* (2016.01)
*H02P 9/04* (2006.01)
(Continued)

(52) U.S. Cl.
CPC ........... *F03D 7/048* (2013.01); *F03D 7/0204* (2013.01); *F03D 7/047* (2013.01);
(Continued)

(58) Field of Classification Search
CPC .......... F03D 7/048; F03D 7/0204; F03D 7/047
See application file for complete search history.

(56) References Cited

U.S. PATENT DOCUMENTS

| 8,332,077 B2 * | 12/2012 | Kondo | .................... F03D 7/047 290/44 |
| 8,489,247 B1 * | 7/2013 | Engler | .................... F01D 17/24 700/287 |

(Continued)

FOREIGN PATENT DOCUMENTS

| CN | 101476541 A | 7/2009 |
| CN | 101684774 A | 3/2010 |

(Continued)

OTHER PUBLICATIONS

International Search Report dated May 25, 2017; PCT/CN2017/077316.

(Continued)

*Primary Examiner* — Tulsidas C Patel
*Assistant Examiner* — Thomas K Quigley
(74) *Attorney, Agent, or Firm* — Ladas & Parry LLP

(57) ABSTRACT

A wind turbine and an operational control method therefor are disclosed. The method comprises: obtaining current directional data from the nacelle of the wind turbine; and, according to the directional data, positional data of each wind turbine of a wind farm, as well as wind condition data as measured by each wind turbine, and controlling operational equipment of the wind turbine, so as to increase power generated by the wind turbine. According to the current direction of the nacelle of the wind turbine, positional data of each wind turbine of a wind farm, and wind condition data as measured by each wind turbine, accurate control policy adjustment is performed in advance on operational equipment of a wind turbine, thereby increasing the power gen- (Continued)

erated by the wind turbine. A device for implementing the control method is also disclosed.

17 Claims, 9 Drawing Sheets

(51) Int. Cl.
 *F03D 7/04* (2006.01)
 *F03D 7/02* (2006.01)
(52) U.S. Cl.
 CPC ..... *F05B 2260/821* (2013.01); *F05B 2270/32* (2013.01); *F05B 2270/321* (2013.01); *Y02E 10/723* (2013.01)

(56) References Cited

U.S. PATENT DOCUMENTS

| | | | |
|---|---|---|---|
| 8,987,929 B2* | 3/2015 | Jayant | F03D 7/0204 290/44 |
| 9,362,858 B2* | 6/2016 | Ma | F03D 7/047 |
| 9,644,610 B2* | 5/2017 | Dalsgaard | F03D 7/048 |
| 9,760,069 B2* | 9/2017 | Betran Palomas | F03D 7/022 |
| 10,044,221 B2* | 8/2018 | Rosenvard | H02J 3/386 |
| 2004/0056486 A1* | 3/2004 | Wobben | B61B 7/00 290/44 |
| 2004/0258521 A1* | 12/2004 | Wobben | F03D 7/0224 416/37 |
| 2005/0169742 A1 | 8/2005 | Kane | |
| 2006/0131889 A1* | 6/2006 | Corten | F03D 1/04 290/43 |
| 2006/0232073 A1* | 10/2006 | Corten | F03B 15/06 290/44 |
| 2006/0273595 A1* | 12/2006 | Avagliano | F03D 7/028 290/44 |
| 2007/0108769 A1* | 5/2007 | Wobben | F03D 7/0204 290/44 |
| 2007/0124025 A1* | 5/2007 | Schram | F03D 7/0224 700/287 |
| 2010/0078940 A1 | 4/2010 | Kondo et al. | |
| 2010/0080703 A1* | 4/2010 | Chen | F03D 7/042 416/1 |
| 2010/0138201 A1* | 6/2010 | Gundling | F03D 7/043 703/9 |
| 2011/0142619 A1* | 6/2011 | Subramanian | F03D 7/048 416/1 |
| 2011/0193344 A1* | 8/2011 | Lafferty | F03D 7/047 290/44 |
| 2012/0051907 A1* | 3/2012 | Rogers | F03D 7/0224 416/1 |
| 2012/0133138 A1* | 5/2012 | Sorensen | F03D 7/028 290/44 |
| 2013/0103202 A1* | 4/2013 | Bowyer | F03D 7/0292 700/275 |
| 2013/0103213 A1 | 4/2013 | Ma | |
| 2014/0017080 A1* | 1/2014 | Porm | F03D 7/02 416/1 |
| 2014/0037447 A1 | 2/2014 | Attia | |
| 2015/0028593 A1 | 1/2015 | Wobben | |
| 2015/0211486 A1* | 7/2015 | de Boer | F03D 7/0224 290/44 |
| 2015/0322926 A1 | 11/2015 | Caponetti et al. | |
| 2016/0215759 A1* | 7/2016 | Fleming | F03D 7/046 |
| 2017/0022974 A1* | 1/2017 | Roma | F03D 17/00 |
| 2017/0241409 A1* | 8/2017 | Kjær | G01P 13/02 |
| 2017/0284368 A1* | 10/2017 | Franke | F03D 7/0292 |
| 2018/0073486 A1* | 3/2018 | Zhang | F03D 7/0284 |

FOREIGN PATENT DOCUMENTS

| | | | | |
|---|---|---|---|---|
| CN | 102830665 A | 12/2012 | | |
| CN | 102945318 A | 2/2013 | | |
| CN | 104937263 A | 9/2015 | | |
| CN | 104963811 A | 10/2015 | | |
| CN | 104989592 A | 10/2015 | | |
| EP | 1790851 A1 | 5/2007 | | |
| EP | 2631470 A1 * | 8/2013 | | F03D 7/0268 |
| EP | 2696067 A2 | 2/2014 | | |
| JP | 2004-101265 A | 4/2004 | | |
| WO | 2014/114295 A1 | 7/2014 | | |
| WO | 2014/125592 A1 | 8/2014 | | |
| WO | 2016/050249 A1 | 4/2016 | | |

OTHER PUBLICATIONS

P.M.O. Gebraad, et al; "Wind Turbine Wake Estimation and Control Using FLORIDyn, a Control-Oriented dynamic Wind Plant Model", 2015 American Control Conference, Palmer House Hilton Jul. 1-3, 2015, Chicago IL USA., pp. 1702-1708.
Australian First Office Action dated Nov. 24, 2018; Appln. No. 2017254511.
The First Chinese Office Action dated Nov. 20, 2018; Appln. No. 201610248976.X.
The Extended European Search Report dated Dec. 10, 2018; Appln. No. 17785283.7.

* cited by examiner

WIND TURBINE AND OPERATIONAL CONTROL METHOD AND DEVICE THEREFOR

CROSS REFERENCE OF TO RELATED APPLICATION

The present application is the national phase of International Application No. PCT/CN2017/077316, titled "WIND TURBINE AND OPERATIONAL CONTROL METHOD AND DEVICE THEREFOR", and filed on Mar. 20, 2017, which claims the priority to Chinese Patent Application No. 201610248976.X, titled "WIND TURBINE AND OPERATION CONTROL METHOD AND APPARATUS THEREOF", filed on Apr. 20, 2016 with the State Intellectual Property Office of the People's Republic of China, which are incorporated herein by reference in their entireties.

TECHNICAL FIELD

The present disclosure relates to the field of wind power generation technology, and particularly to a wind turbine and an operation control method and apparatus thereof.

BACKGROUND

With the gradual expansion of scale of wind turbines and the increasing improvement in safety protection of the wind turbines, it is a problem in wind turbine technology that how to improve power generation performance, such as power generation amount and availability, of the wind turbines to gain maximum energy benefit and the economic benefit.

During control of a wind turbine, wind speed determination is one of factors that determine control effect of the wind turbine. Accurate prediction of wind speed can facilitate improving a control strategy for the wind turbine to achieve a better control effect.

At present, a main control system of a wind turbine mostly performs control strategy adjustment and yawing passively based on its detected wind speed variation or wind direction variation. For example, if a main control system begins to control a pitch control system to perform a pitch variation operation after a wind speed variation is detected by a wind turbine, then a pitch variation of a blade will lag behind the wind speed variation, resulting in an unstable rotational speed of an impeller and loss of power generation amount. For another example, if a main control system begins to control a yawing system to perform yawing after a wind direction variation is detected by a wind turbine, then a yawing action will lag behind the wind direction variation, resulting in a significant decrease in a rotational speed of an impeller after the wind direction variation and resulting in loss of power generation amount.

In practice, with the increase of capability of a wind turbine, loss of power generation amount caused during long term operation is immeasurable. Therefore, a wind speed value and a wind direction value need to be predicted in a control strategy of a wind turbine, to realize active pitch variation and active yawing of the wind turbine.

Currently, there are three ways to predict a wind speed and a wind direction of a wind turbine.

The first way is using wind speed values and wind direction values measured by anemometer towers. Due to long distances between the anemometer towers and the wind turbine and the limited number of the anemometer towers, the measured wind speed values and the measured wind direction values are only considered as a reference instead of data required by controlling the wind turbine. Additionally, a distance between each anemometer tower and each wind turbine is unknown, hence it is difficult to seize the accurate moment to control or yawing in advance. What's more, due to the limited number of the anemometer towers, the anemometer towers is likely to coincide with multiple wind turbines in direction, and wind turbulence will cause a great influence and deviation on the wind speed value and the wind direction value. Besides, if a wind farm is in a mountainous region, wind speed values and wind direction values measured by the anemometer towers can not be considered as a control basis for all wind turbines as heights of the wind turbines are different.

The second way is using a weather forecast to predict the wind speed value. This prediction method is aimless, and the predicted wind speed value is quite inaccurate.

The third way is predicting the wind speed value and the wind direction value based on big data. This prediction method requires historical data of a long term operation, and has a requirement on both data quantity and quality of the historical data. In addition, the prediction method can only make a prediction with a certain probability, and can not reflect a true wind speed value and a true wind direction value. Meanwhile, as the big data includes too much historical data, prediction of the wind speed value and the wind direction value based on the big data has a certain extent of lag for controlling the wind turbine.

SUMMARY

The present disclosure is to provide a wind turbine and an operation control method and apparatus thereof to autonomously control an operation device of the wind turbine in advance, thereby increasing power generation amount of the wind turbine.

According to an aspect of the present disclosure, an operation control method for a wind turbine is provided. The method includes: acquiring data of a current orientation of a nacelle of a current wind turbine; and controlling an operation device of the current wind turbine based on the data of the orientation, location data of each wind turbine in a wind farm, and wind condition data measured from the each wind turbine, to increase power generation amount of the wind turbine.

According to another aspect of the present disclosure, a wind turbine including the above operation control apparatus is further provided.

In the operation control method for the wind turbine, the operation control apparatus applying the method, and the wind turbine according to the embodiments of the present disclosure, accurate control strategy adjustment is performed on the operation device of the current wind turbine in advance based on the current orientation of the nacelle of the current wind turbine, the location data of each wind turbine in the wind farm, and the wind condition data measured from the each wind turbine, thereby increasing power generation amount of the current wind turbine. In this way, wind condition variation prediction can be performed based on wind condition data measured in a real-time manner from each wind turbine, and amount of data processing is small, avoiding lag, complexity and inaccuracy caused in wind condition variation prediction based on a large amount of historical data. Moreover, no additional hardware testing device is needed, thus saving operating cost.

Based on the above technical solution, when the wind turbine is in operation, over-speed protection may also be performed on the wind turbine in a case of a sudden change in a wind speed, ensuring operation life of the wind turbine.

In addition, based on the above technical solution, when the wind turbine is in a stopped state, standby start or yawing may also be performed in advance to make the wind turbine enter into a running state quickly, thereby increasing power generation amount of the current wind turbine effectively.

DETAILED DESCRIPTION OF EMBODIMENTS

A wind condition data sharing mechanism is built between wind turbines in a wind farm according to the present disclosure. Specifically, a central monitoring system of a wind farm collects, from a wind turbine in the wind farm, geographical location data of the wind turbine and wind condition data collected by the wind turbine in a real-time manner, and distributes the collected data to other wind turbines in the wind farm. Each wind turbine may perform control strategy adjustment in advance based on received wind condition data measured from other wind turbines to increase power generation amount. In addition, amount of data processing is small, avoiding lag, complexity and inaccuracy caused in wind condition variation prediction based on a large amount of historical data.

The wind condition data includes, but is not limited to, a wind speed value and a wind direction value. The control strategy adjustment involved includes, but is not limited to, yawing control and/or pitch control performed on a wind turbine. Additionally, the control strategy adjustment involved may further include yawing control performing, pitch control performing, and/or entering into a standby state in a case of wind rising, based on a running state or a stopped state of the wind turbine accordingly.

Furthermore, an intelligent wind farm cluster control system covering multiple wind farms may be built through cloud computing technology and Internet of Things technology.

Intelligent Wind Farm Cluster Control System

Figure 1:
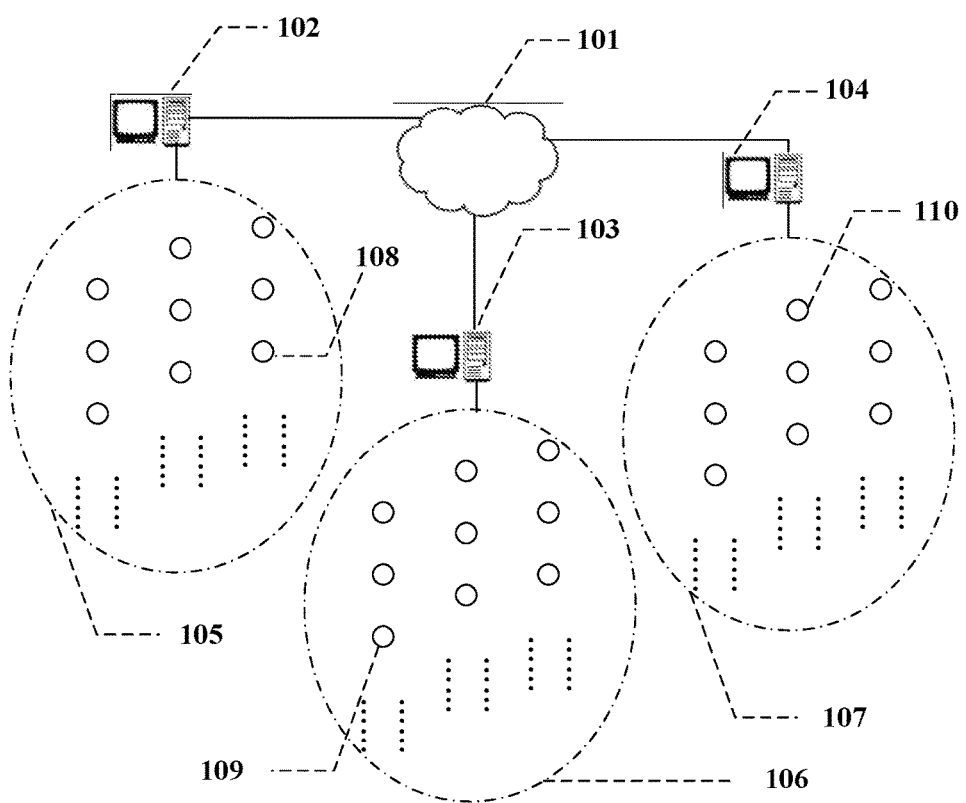
FIG. 1 is an exemplary topological graph of an intelligent wind farm cluster control system according to a general concept of the present disclosure.

FIG. 1 is an exemplary topological graph of an intelligent wind farm cluster control system according to the present disclosure.

As shown in FIG. 1, a cloud server 101 is arranged in the cloud and is configured to receive and store various kinds of data (such as wind turbine parameter, environmental parameter and operating parameter) relevant to wind turbine and operation of wind turbine, which is collected from multiple wind farms 105, 106 and 107. A cloud server 101 may further coordinate and manage wind turbines in the multiple wind farms 105, 106 and 107 based on the received data relevant to wind turbine and operation of wind turbine.

The multiple wind farms 105, 106 and 107 are provided with wind farm central monitoring systems 102, 103 and 104 respectively. Each of the wind turbines (such as wind turbines 108, 109 and 110) in the multiple wind farms 105, 106 and 107 uploads, its collected data (such as wind turbine parameter, environmental parameter and operating parameter) relevant to wind turbine and operation of wind turbine, to the wind farm central monitoring systems 102, 103 and 104 in its wind farm. The data uploaded by each of the wind turbines may include geographical location data (such as geographical location coordinates) thereof and wind condition data (such as a wind speed value and a wind direction value) detected in a real-time manner.

The wind farm central monitoring systems 102, 103 and 104 receive, the data (including geographical location data of the wind turbine and wind condition data detected by the wind turbine in a real-time manner) relevant to wind turbine and operation of wind turbine, collected by each of the wind turbines in their respective wind farms 105, 106 and 107, and distribute data collected by each wind turbine to other wind turbines in their respective wind farms 105, 106 and 107. In this way, each wind turbine may perform corresponding control, such as yawing control and/or pitch control, on its operation device based on the geographical location data as received and the wind condition data detected in a real-time manner.

On the other hand, the wind farm central monitoring systems 102, 103 and 104 communicate with the cloud server 101 respectively, to upload the various kinds of data (such as wind turbine parameter, environmental parameter and operating parameter) relevant to wind turbine and operation of wind turbine, collected by wind turbines in their respective wind farms.

Collection of Geographical Locations and Wind Condition Data

Each of the wind turbines (such as the wind turbine 108) may be provided with various kinds of sensors at multiple locations to collect its geographical location data and operating parameter.

Figure 2:
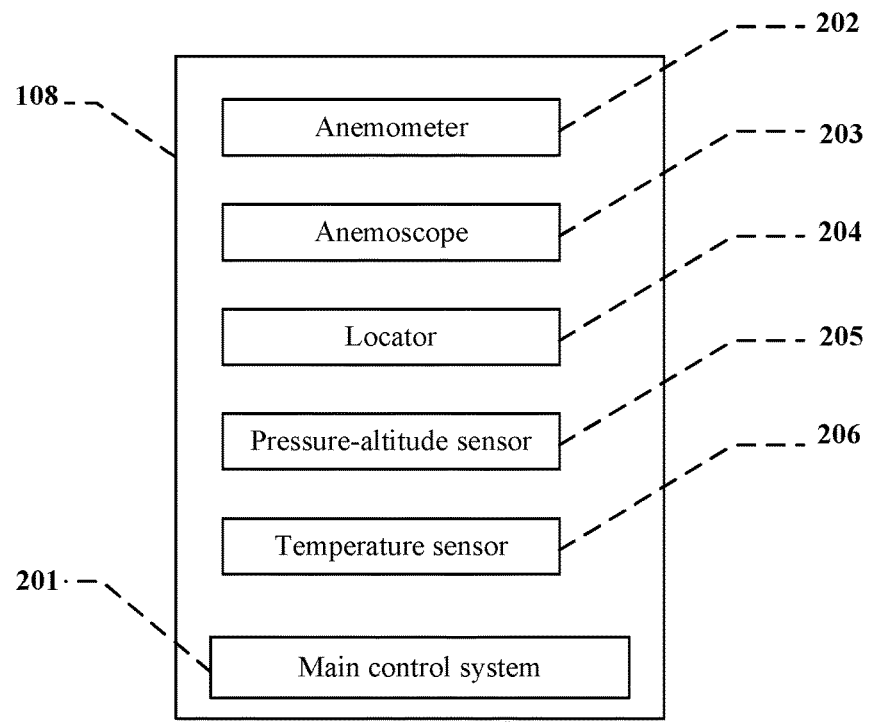
FIG. 2 is an exemplary schematic diagram of sensors arranged in a wind turbine according to a general concept of the present disclosure.

FIG. 2 is an exemplary schematic diagram of sensors arranged in a wind turbine according to the present disclosure.

As shown in FIG. 2, the wind turbine 108 is at least provided with an anemometer 202, an anemoscope 203 and a locator 204.

The anemometer 202 and the anemoscope 203 are configured to detect a wind speed and a wind direction respectively. The locator 204 is configured to collect geographical location coordinates of the wind turbine 108. Additionally, other sensors, such as a pressure-altitude sensor 205 configured to detect an altitude of the wind turbine 108 and a temperature sensor 206 configured to measure temperatures of multiple parts of the wind turbine 108, may also be provided. A main control system 201 of the wind turbine 108 uploads the detected parameter data (including but not limited to a wind speed value, a wind direction value, geographical location coordinates, an altitude value, a temperature value and so on) to the wind farm central monitoring system 102.

Polar Coordinates Calculation and Virtual Radar Establishment

Each wind turbine generates virtual radar data as a reference for its autonomous operating control, based on the geographical location data of other wind turbines received from the wind farm central monitoring system in its wind farm and the wind condition data detected in a real-time manner.

Figure 3:
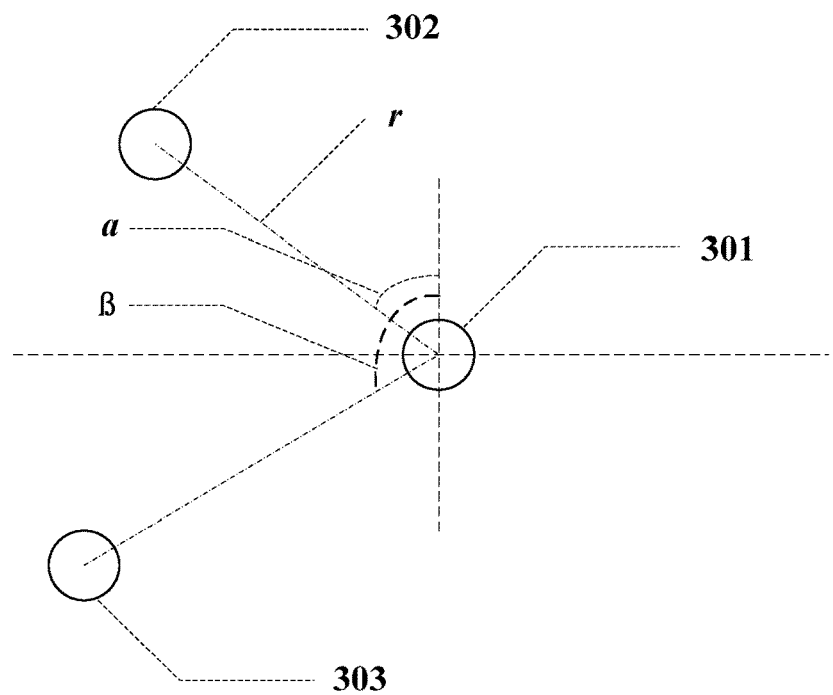
FIG. 3 is a schematic diagram of polar coordinates of a wind turbine in a wind farm and generated virtual radar according to the present disclosure.

FIG. 3 is a schematic diagram of polar coordinates of a wind turbine in a wind farm and generated virtual radar according to the present disclosure. Specifically, a wind turbine 301 establishes a polar coordinate system taking a location of itself (a current wind turbine) as a pole and a ray in a predetermined angle (for example, due north) from the pole as a polar axis. For the wind turbine 301 (the current wind turbine), location data of other wind turbines (for example, a wind turbine 302) in the same wind farm are each expressed as polar coordinates with a distance r from the pole and an angle a relative to the polar axis.

It is assumed that GPS coordinates of the wind turbine 301 are [X1, Y1], and GPS coordinates of wind turbine 302 are [X2, Y2]. According to the Pythagorean theorem, the distance r between the wind turbine 301 and the wind turbine 302 is:

$$r = \sqrt{(Y2-Y1)^2 + (X2-X1)^2} \quad \text{Formula (1)}$$

The vertical direction (due north) shown in FIG. 3 is considered as the polar axis, i.e., a direction with an angle of 0 degree. The polar angle a of the wind turbine 302 may be obtained by calculating sine value sin a and cosine value cos a of a location of the wind turbine 302 relative to the wind turbine 301:

$$\sin a = \frac{X2 - X1}{r} \quad \text{Formula (2)}$$

$$\cos a = \frac{Y2 - Y1}{r} \quad \text{Formula (3)}$$

The polar angle a of the wind turbine 302 is determined based on magnitude and sign of the calculated sine value sin a and the calculated cosine value cos α.

If sin a>0 and cos a>0, the polar angle of the wind turbine 302 is determined as a.

If sin a>0 and cos a<0, the polar angle of the wind turbine 302 is determined as a+90.

If sin a<0 and cos a<0, the polar angle of the wind turbine 302 is determined as a+180.

If sin a<0 and cos a>0, the polar angle of the wind turbine 302 is determined as a+270.

If sin a=0 and cos a=1, the polar angle of the wind turbine 302 is determined as 0.

If sin a=1 and cos a=0, the polar angle of the wind turbine 302 is determined as 90.

If sin a=0 and cos a=−1, the polar angle of the wind turbine 302 is determined as 180.

If sin a=−1 and cos a=0, the polar angle of the wind turbine 302 is determined as 270.

The polar angle of the wind turbine 302 is a. If it is assumed that a variable for calculating the polar angle of the wind turbine 303 is β, then the polar angle of the wind turbine 303 is β+90. Similarly, polar coordinates data of other wind turbines in the same wind farm are calculated with the above method and are considered as their location data.

After calculating polar coordinate data of each wind turbine in the wind farm relative to the current wind turbine (the wind turbine 301), virtual radar as shown in FIG. 3 may be established. Based on the virtual radar, the wind turbine 301 can locate other wind turbines in the wind farm, such as the wind turbine 302 and the wind turbine 303.

Associative Storage

For convenience of maintaining and managing calculated polar coordinates data of other wind turbines and received wind speed values and wind direction values measured from other wind turbines, each wind turbine may store polar coordinates of wind turbines in the wind farm in association with the wind speed values and the wind direction values measured from the wind turbines. For example, polar coordinate data of each wind turbine, and the wind speed value and the wind direction value measured from other wind turbines and received by the each wind turbine may be stored in a form of a multidimensional array.

Optionally, polar coordinate data of each wind turbine, and an altitude value, the wind speed value and the wind direction value measured from other wind turbines and received by the each wind turbine are stored in a multidimensional array in an associated manner.

An example of data stored in an associated manner described above is shown in following table.

| Sequence number of wind turbine | Data sequence |
|---|---|
| 1 | [Angle value 1, Distance value 1, Wind speed value 1, Wind direction value 1, Altitude value 1] |
| 2 | [Angle value 2, Distance value 2, Wind speed value 2, Wind direction value 2, Altitude value 2] |
| 3 | [Angle value 3, Distance value 3, Wind speed value 3, Wind direction value, Altitude value 3] |
| 4 | [Angle value 4, Distance value 4, Wind speed value 4, Wind direction value 4, Altitude value 4] |
| . . . | . . . |
| n | [Angle value n, Distance value n, Wind speed value n, Wind direction value n, Altitude value n] |

The angle value 1 to the angle value n are polar angle values of wind turbine 1 to wind turbine n respectively. The distance value 1 to the distance value n are polar distance values of the wind turbine 1 to the wind turbine n respectively. The wind speed value 1 to the wind speed value n are wind speed values measured from the wind turbine 1 to the wind turbine n respectively. The wind direction value 1 to the wind direction value n are wind direction values measured from the wind turbine 1 to the wind turbine n respectively. The altitude value 1 to the altitude value n are altitude values measured from the wind turbine 1 to the wind turbine n respectively.

In this way, the current wind turbine may perform corresponding control, such as yawing control and/or pitch control, on its operation device, based on polar coordinate data of the wind turbine 1 to the wind turbine n and wind condition data measured in a real-time manner from the wind turbine 1 to the wind turbine n, which are stored in an associated manner.

Embodiments of the present disclosure are described in detail hereinafter in conjunction with drawings.

First Embodiment

Figure 4:
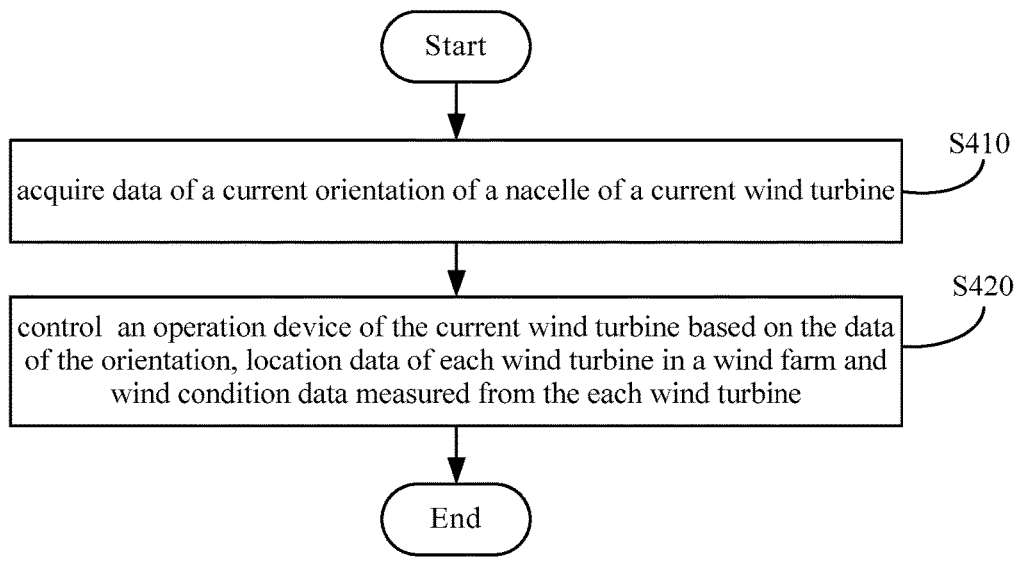
FIG. 4 is a flow chart of an operation control method for a wind turbine according to a first embodiment of the present disclosure.

FIG. 4 is a flow chart of an operation control method for a wind turbine according to the first embodiment of the present disclosure. For example, the method according to the embodiment is implemented in a main control system of the wind turbine.

Reference is made to FIG. 4. In step S410, data of a current orientation of a nacelle of a current wind turbine is acquired.

Specifically, the current orientation of the nacelle of the current wind turbine is usually consistent with a yawing angle of the current wind turbine. Therefore, optionally, in step S410, a yawing angle value read from a yawing counter of the current wind turbine is obtained, and the data of the current orientation of the nacelle of the current wind turbine is obtained from the yawing angle value. Practically, the method for acquiring the current orientation of the nacelle of the current wind turbine is not limited to the above manner, other devices such as a direction finder (such as a manual radio direction finer or an electronic compass direction finder) arranged on the nacelle may also be used to acquire the data of the current orientation.

In step S420, an operation device of the current wind turbine is controlled based on the data of the orientation, location data of each wind turbine in a wind farm, and wind condition data measured from the each wind turbine, to increase power generation amount of the current wind turbine.

Specifically, the main control system of the wind turbine may predict wind condition variation of the current wind turbine based on the orientation of the current wind turbine, and data relevant to locations of other wind turbines in the wind farm and wind condition data measured from each wind turbine in a real-time manner which are received from a wind farm central monitoring system. Control strategy adjustment is performed in advance on the operation device of the current wind turbine by utilizing existing hardware testing equipment, thus increasing power generation amount of the current wind turbine without adding additional hardware testing equipment, and saving operating cost.

To obtain the location data of other wind turbines in the wind farm and establish a virtual radar, the operation control method for the wind turbine according to the embodiment of the present disclosure further includes: receiving geographical location coordinates (for example, GPS coordinates) measured from other wind turbines, and calculating polar coordinates of the other wind turbines based on geographical location coordinates of the current wind turbine and the geographical location coordinates measured from the other wind turbines. The process of calculating the polar coordinates of each wind turbine and establishing the virtual radar is described in detail in the above section "Polar Coordinates Calculation and Virtual Radar Establishment", which is not described herein.

Furthermore, to collect the wind condition data measured from the other wind turbines, the operation control method for the wind turbine according to the embodiment of the present disclosure further includes: receiving wind speed values and wind direction values measured from the other wind turbines, and storing the polar coordinates of each wind turbine in the wind farm in association with the wind speed value and the wind direction value measured from the each wind turbine.

Second Embodiment

Figure 5:
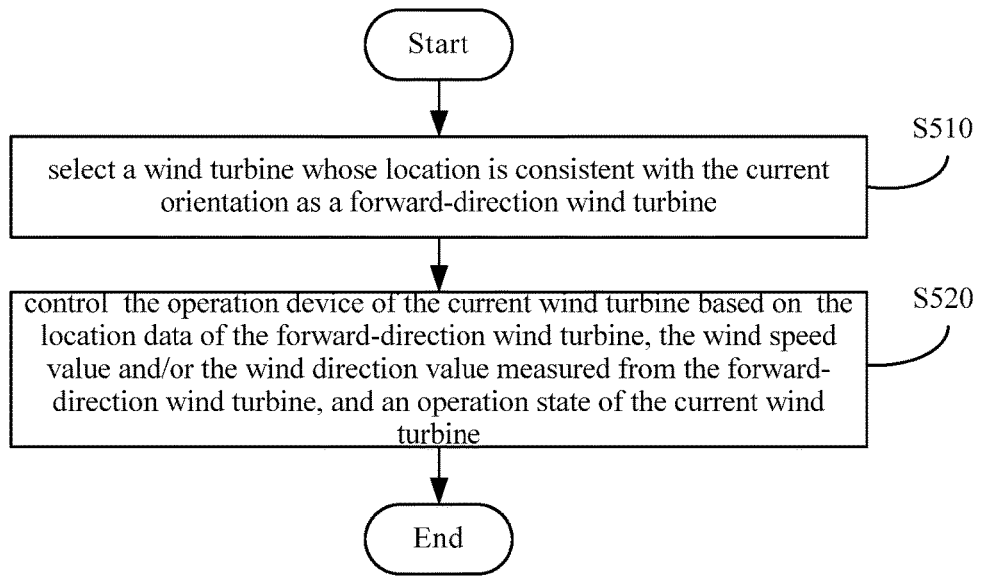
FIG. 5 is a flow chart of an operation control method for a wind turbine according to a second embodiment of the present disclosure.

FIG. 5 is a flow chart of an operation control method for a wind turbine according to the second embodiment of the present disclosure. An exemplary processing of step S420 shown in FIG. 4 is described in the second embodiment.

Referring to FIG. 5, in step S510, a wind turbine whose location is consistent with the current orientation is selected as a forward-direction wind turbine. The wind condition data measured from the selected forward-direction wind turbine is taken as a reference for predicting wind condition variation to perform corresponding control strategy adjustment in advance.

Specifically, location data, whose polar angle has a difference, within a predetermined angle range, with respect to the polar angle of the current orientation of the nacelle of the current wind turbine, is selected from the location data of other wind turbines in the wind farm, and a wind turbine corresponding to the selected location data is determined as the forward-direction wind turbine.

Figure 6:
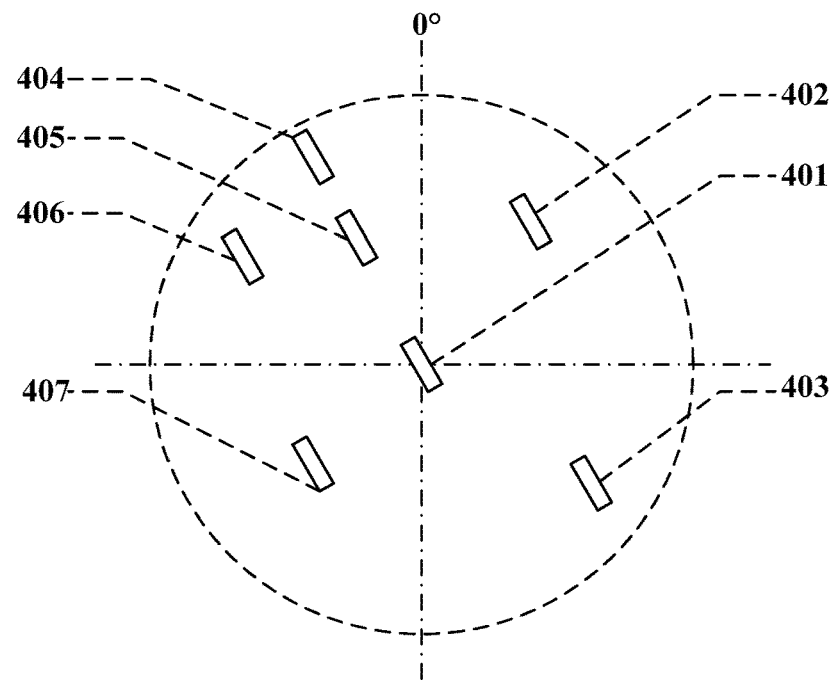
FIG. 6 is an exemplary schematic diagram of selecting a forward-direction wind turbine according to the second embodiment of the present disclosure.

FIG. 6 is an exemplary schematic diagram of selecting the forward-direction wind turbine according to the second embodiment of the present disclosure. Referring to FIG. 6, in the virtual radar generated by a wind turbine 401 based on the calculated polar coordinates of each wind turbine in the wind farm, locations of wind turbines 404 and 405 are basically consistent with a current orientation of a nacelle of the current wind turbine 401. That is, a difference between a polar angle of each of the wind turbines 404, 405 and a polar angle of the current orientation of the nacelle of the current wind turbine 401 is within a predetermined angle range (for example, [−2 degree, 2 degree]) respectively. Therefore, the wind turbine 404 or the wind turbine 405 can be considered as the current forward-direction wind turbine of the wind turbine 401.

As shown in FIG. 6, the number of the wind turbine whose location is consistent with the current orientation may be more than one. Any one of the more than one wind turbine can be selected as the current forward-direction. However, as a wind turbine close to the current wind turbine has a similar wind condition as the current wind turbine, it is more appropriate to determine wind condition data measured from such a wind turbine as a reference. Correspondingly, the selecting the forward-direction wind turbine may further include: if the number of the wind turbine, corresponding to the location data whose polar angle has the difference, within the predetermined angle range, with respect to the polar angle of the current orientation of the nacelle of the current wind turbine, is more than one, selecting, from the more than one corresponding wind turbine, a wind turbine which has a minimum distance from the current wind turbine, as the forward-direction wind turbine. By selecting the forward-direction wind turbine based on polar angle and distance, prediction of wind condition variation will not be affected by wind turbulence, improving accuracy of the prediction.

Further, if there is a great difference between an altitude of the wind turbine selected as the reference and an altitude of the current wind turbine, then the wind condition of the wind turbine selected as the reference will differ greatly from the wind condition of the current wind turbine due to the difference in altitude. That is, the wind condition of the wind turbine selected as the reference has a low reference value.

Therefore, preferably, the operation control method for the wind turbine according to the embodiment of the present disclosure further includes: receiving altitude values measured from the other wind turbines, and storing the polar coordinates of each wind turbine in the wind farm in association with an altitude value, the wind speed value and the wind direction value measured from the each wind turbine. Correspondingly, in step S510, a wind turbine which satisfies the following condition is selected, from location data of the other wind turbines in the wind farm, as the forward-direction wind turbine: its polar angle has a difference, within a predetermined angle difference range, with respect to the polar angle of the current orientation of the nacelle of the current wind turbine, and its altitude value has a difference, within a predetermined altitude difference range (for example, [−20 meters, 20 meters]), with respect to the altitude value of the current wind turbine. If an altitude of a wind turbine differs greatly from the altitude of the current wind turbine (for example, there is an altitude difference greater than 100 meters), then there is no actual reference value to select such a wind turbine as the forward-direction wind turbine.

Based on the above processing, the wind turbine, whose location is consistent with the current orientation of the nacelle of the current wind turbine and whose altitude is close to the altitude of the current wind turbine, is selected as the current forward-direction wind turbine for the current wind turbine, to perform control strategy adjustment for the current wind turbine based on relatively reliable wind condition data.

In step S520, the operation device of the wind turbine is controlled based on the location data of the forward-direction wind turbine, the wind speed value and/or the wind direction value measured from the forward-direction wind turbine and an operation state of the current wind turbine, to increase power generation amount of the current wind turbine.

For example, if the current wind turbine is in a running state, and a wind direction difference between the wind direction value measured from the forward-direction wind turbine and a wind direction value previously measured from the forward-direction wind turbine is beyond a predetermined wind direction difference range, then yawing control is performed on the current wind turbine in advance based on the wind speed value and the wind direction value measured from the forward-direction wind turbine and a distance between the forward-direction wind turbine and the current wind turbine.

Figure 7:
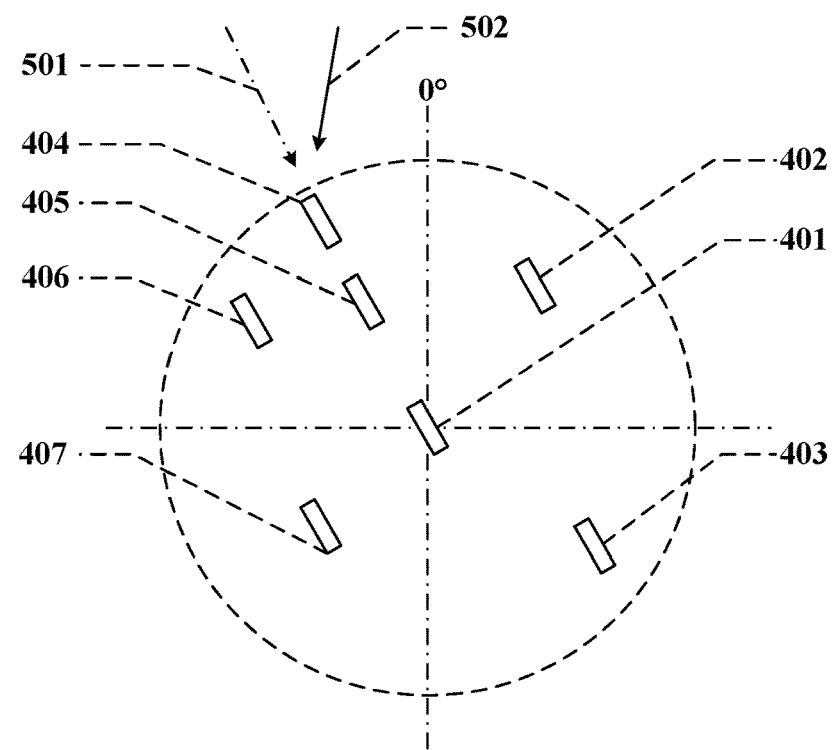
FIG. 7 is an exemplary schematic diagram of processing of step S520.

FIG. 7 is an exemplary schematic diagram of processing of step S520. Referring to FIG. 7, it is assumed that a wind direction 501 is consistent with a current orientation (i.e., a current yawing angle) of a nacelle of a wind turbine 401 before wind direction variation is detected, and a current forward-direction wind turbine for the wind turbine 401 is a wind turbine 405. When a wind direction measured in a real-time manner from the wind turbine 405 (the forward-direction wind turbine) that received by the wind turbine 401 is changed from the wind direction 501 to a wind direction 502, and if a difference value between the wind direction 501 and the wind direction 502 is beyond the predetermined wind direction difference range, i.e., a condition for performing yawing control being satisfied, then a control time for pre-yaw is calculated based on a distance between the wind turbine 401 and the wind turbine 405, a variation value between wind direction angles, and a wind speed value measured from the wind turbine 405, to control a yawing system of the wind turbine 401 to perform yawing towards the wind direction 502 in advance, for realizing accurate and autonomous yawing to increase power generation amount. In the technical solutions of the present disclosure, existing hardware testing equipment is utilized to perform accurate yawing control in advance without adding additional testing equipment, which saves operating cost.

On the other hand, if the difference between the wind direction 501 and the wind direction 502 is not beyond the predetermined wind direction difference range, then the wind direction value measured by the wind turbine 401 is taken as a yawing reference, which is similar to the existing yawing control.

Third Embodiment

Figure 8:
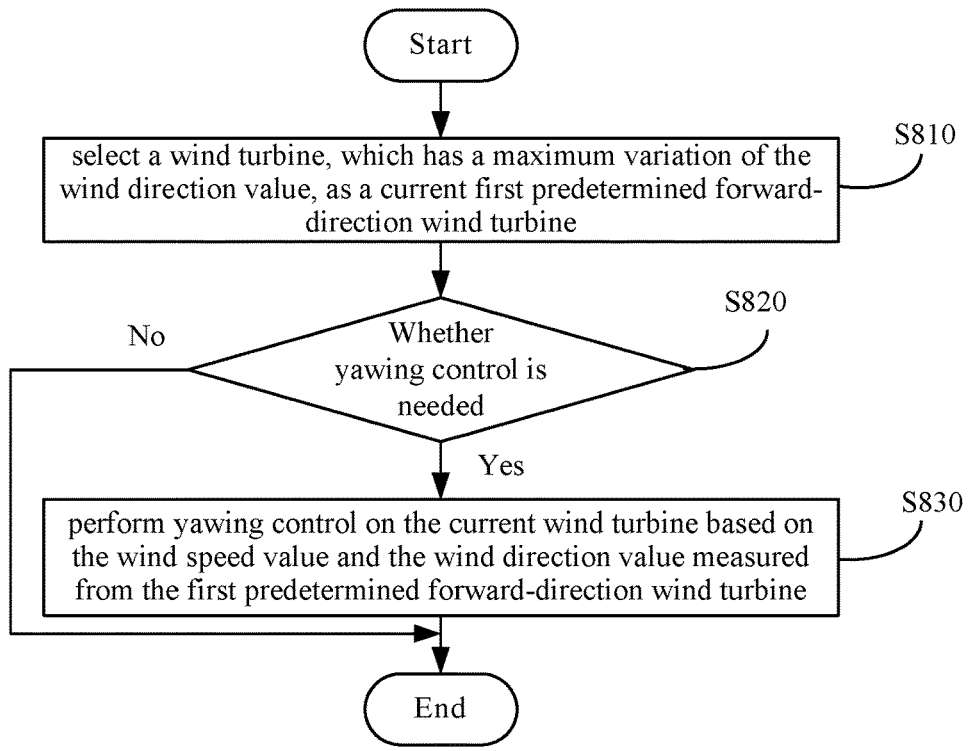
FIG. 8 is a flow chart of an operation control method for a wind turbine according to a third embodiment of the present disclosure.

FIG. 8 is a flow chart of an operation control method for a wind turbine according to a third embodiment of the present disclosure. An exemplary processing of step S520 shown in FIG. 5 is described in the third embodiment.

Specifically, the processing according to the third embodiment is particularly suitable for a situation in which a wind direction suddenly changes and/or frequently changes.

Referring to FIG. 8, in step S810, a wind turbine, which has a maximum variation of the wind direction value, is selected, from the other wind turbines, as a current first predetermined forward-direction wind turbine.

The current first predetermined forward-direction wind turbine selected herein may be understood as a wind turbine for determining a target direction to which the current wind turbine is to yaw in a case that a condition for subsequently performing yawing is met. The current wind turbine performs yawing towards a wind direction detected by the determined first predetermined forward-direction wind turbine.

In step S820, whether yawing control needs to be performed is determined based on changing states of the wind conditions of the forward-direction wind turbine and the first predetermined forward-direction wind turbine.

Specifically, if the wind speed values measured from the forward-direction wind turbine and the first predetermined forward-direction wind turbine are both greater than a predetermined first wind speed threshold, and variation values of wind directions measured from the forward-direction wind turbine and the first predetermined forward-direction wind turbine are both greater than a predetermined threshold of wind direction variation, then it is determined that yawing control needs to be performed.

As wind direction changes frequently and shifts greatly in a case of a low wind speed, and it is unnecessary to frequently perform yawing control under a low wind speed, yawing control is performed only in a case that the wind speed measured from the first predetermined forward-direction wind turbine is high and the variation value of the wind direction measured from the first predetermined forward-direction wind turbine is great.

On the other hand, if any one of the wind speed values measured from the forward-direction wind turbine and the first predetermined forward-direction wind turbine is not greater than the first wind speed threshold, or any one of the variation values of the wind directions measured from the forward-direction wind turbine and the first predetermined forward-direction wind turbine is not greater than a first wind direction threshold, then it is determined that yawing control does not need to be performed.

If in step S820, it is determined that yawing control needs to be performed, then in step S830, yawing control is performed on the current wind turbine in advance based on the wind speed value and the wind direction value measured from the first predetermined forward-direction wind turbine, to make the current wind turbine yaw to the wind direction detected by the first predetermined forward-direction wind turbine, thereby increasing power generation amount of the current wind turbine.

Specifically, if the current wind turbine is in a stopped state, then the current wind turbine is controlled to enter into a standby state, and a yawing system of the wind turbine is controlled to perform yawing based on the wind direction value measured from the first predetermined forward-direction wind turbine. In this way, a delay in starting time caused by yawing is reduced, and a running state of power generating is immediately entered, thus increasing power generation amount of the current wind turbine.

On the other hand, if the current wind turbine is in a running state, then yawing control is performed on the current wind turbine in advance based on the distance between the first predetermined forward-direction wind turbine and the current wind turbine, and the wind speed value and the wind direction value measured from the first predetermined forward-direction wind turbine. That is, the wind speed value and the wind direction value measured from the current first predetermined forward-direction wind turbine are considered as references for performing autonomous yawing control, to make the current wind turbine yaw to the wind direction detected by the first predetermined forward-direction wind turbine, thereby increasing power generation amount of the current wind turbine.

Figure 9:
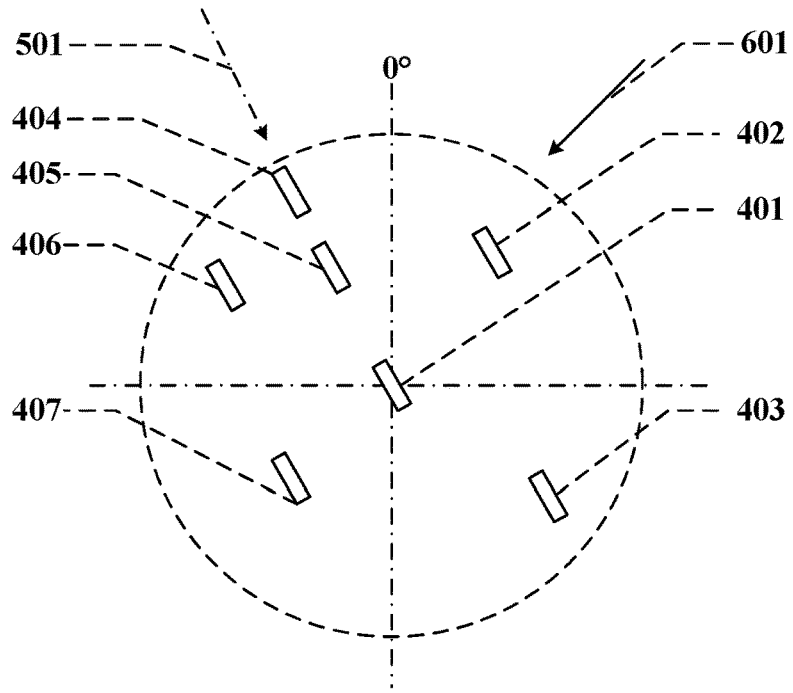
FIG. 9 is an example of processing of the operation control method for the wind turbine according to the third embodiment of the present disclosure.

FIG. 9 shows an example of processing of the operation control method for the wind turbine according to the third embodiment of the present disclosure. Reference is made to FIG. 9, and it is assumed that a wind direction changes frequently or changes suddenly. The currently known wind direction is a wind direction 501, and a wind turbine 401 determines that a wind turbine 403 has a maximum variation of wind direction based on received wind condition data measured in a real-time manner from each wind turbine. In this case, the wind turbine 403 is selected as the first predetermined forward-direction wind turbine, and yawing is to be performed towards a wind direction 601 measured by the wind turbine 403. A control time for pre-yaw is calculated based on a distance between the wind turbine 401 and the wind turbine 403, a variation value of a wind direction angle and a wind speed value measured from the wind turbine 403, for controlling a yawing system of the wind turbine 401 to yaw towards the wind direction 601 in advance, to achieve autonomous yawing accurately and increase power generation amount.

If in step S820, it is determined that yawing control does not need to be performed, then control may be performed based on a usual control strategy, which is no described herein.

Based on the above processing, in a case that a wind direction changes frequently or changes suddenly, wind condition data measured from a wind turbine with a great variation of wind speed in the wind farm is taken as a reference for performing accurate yawing control in advance. In this way, power generation amount of the wind turbine is increased by utilizing existing testing equipment, without adding additional hardware testing equipment, thus saving operating cost.

Fourth Embodiment

Figure 10:
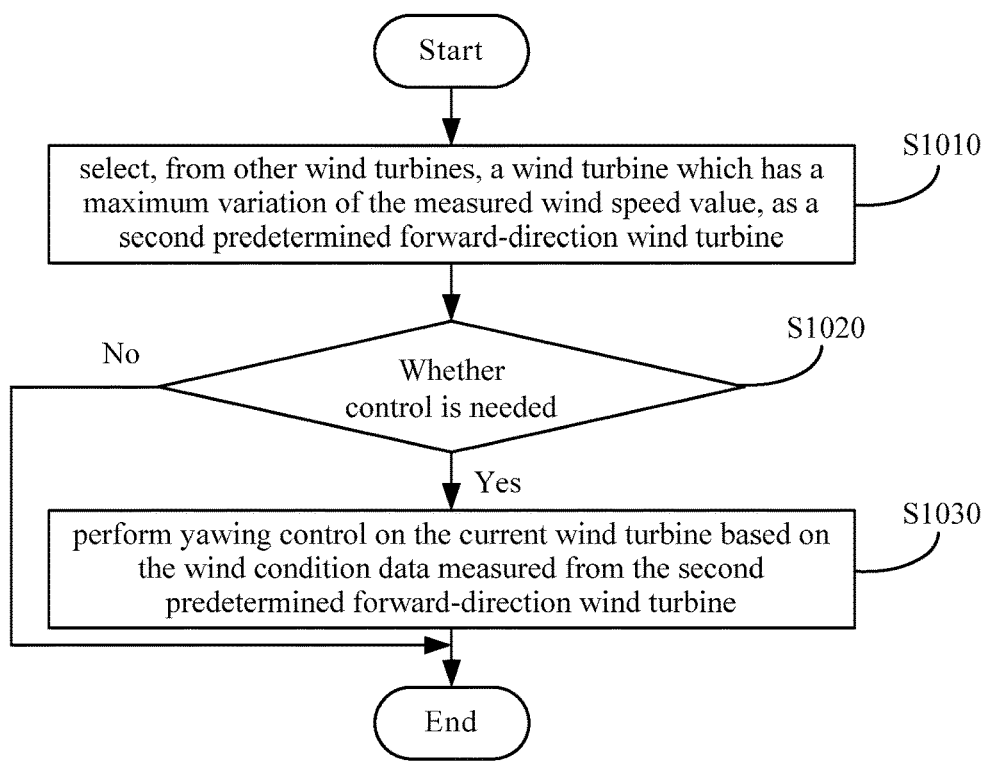
FIG. 10 is a flow chart of an operation control method for a wind turbine according to a fourth embodiment of the present disclosure.

FIG. 10 is a flow chart of an operation control method for a wind turbine according to the fourth embodiment of the present disclosure. Another illustrative processing of step S520 shown in FIG. 5 is described in the fourth embodiment.

Specifically, the processing according to the fourth embodiment is particularly suitable for a situation in which a wind speed suddenly changes and/or frequently changes.

Referring to FIG. 10, in step S1010, a wind turbine, which has a maximum variation of the wind speed value, is selected, from the other wind turbines, as a current second predetermined forward-direction wind turbine. The wind condition data measured from the second predetermined forward-direction wind turbine is taken as a reference for performing corresponding control on the current wind turbine in subsequent processing.

In step S1020, whether control needs to be performed is determined based on changing states of wind speeds of the forward-direction wind turbine and the first predetermined forward-direction wind turbine.

Specifically, if a variation value of the wind speed measured from the second predetermined forward-direction wind turbine is greater than a predetermined first wind speed variation threshold, and a variation value of the wind speed measured from the forward-direction wind turbine is greater than a predetermined second wind speed variation threshold, then it is determined that control needs to be performed. The second wind speed variation threshold may be less than the first wind speed variation threshold here. That is, only in a case that the variation values of the wind speeds measured from the forward-direction wind turbine and the second predetermined forward-direction wind turbine are both great, it is determined that control needs to be performed.

Correspondingly, if the variation value of the wind speed measured from the second predetermined forward-direction wind turbine is not greater than the first wind speed variation threshold, or the variation value the wind speed measured from the forward-direction wind turbine is not greater than the second wind speed variation threshold, then it is determined that control does not need to be performed.

If in step S1020, it is determined that control needs to be performed, then in step S1030, control is performed on the current wind turbine based on the wind condition data measured from the second predetermined forward-direction wind turbine.

Specifically, if the current wind turbine is in a running state, over-speed protection control or control strategy optimizing adjustment may be performed on the current wind turbine based on magnitude of the wind speed value measured from the second predetermined forward-direction wind turbine.

For example, if the wind speed value measured from the second predetermined forward-direction wind turbine does not reach a predetermined cut-out wind speed of wind turbine, then yawing control and pitch control are performed on the current wind turbine in advance based on a distance between the second predetermined forward-direction wind turbine and the current wind turbine, the wind speed value and the wind direction value measured from the second predetermined forward-direction wind turbine. That is, if the wind speed value measured from the second predetermined forward-direction wind turbine is in a safety range of operation of a wind turbine, timely and advanced yawing control and pitch control may be performed with utilization of an increase in the wind speed, to increase power generation amount of the current wind turbine. Processing of the yawing control mentioned herein is similar to that in the second embodiment, which is not described herein.

As another example, if the wind speed value measured from the second predetermined forward-direction wind turbine reaches the predetermined cut-out wind speed of wind turbine, then an expected arrival time of a gale is acquired based on the location data of the second predetermined forward-direction wind turbine and the wind speed value measured from the second predetermined forward-direction wind turbine, to make preparations for performing over-speed protection control on the current wind turbine. In this way, over-speed protection control is performed in advance in a case that a wind speed suddenly increases to exceed the cut-out wind speed of wind turbine, thereby ensuring operation life of the wind turbine.

Figure 11:
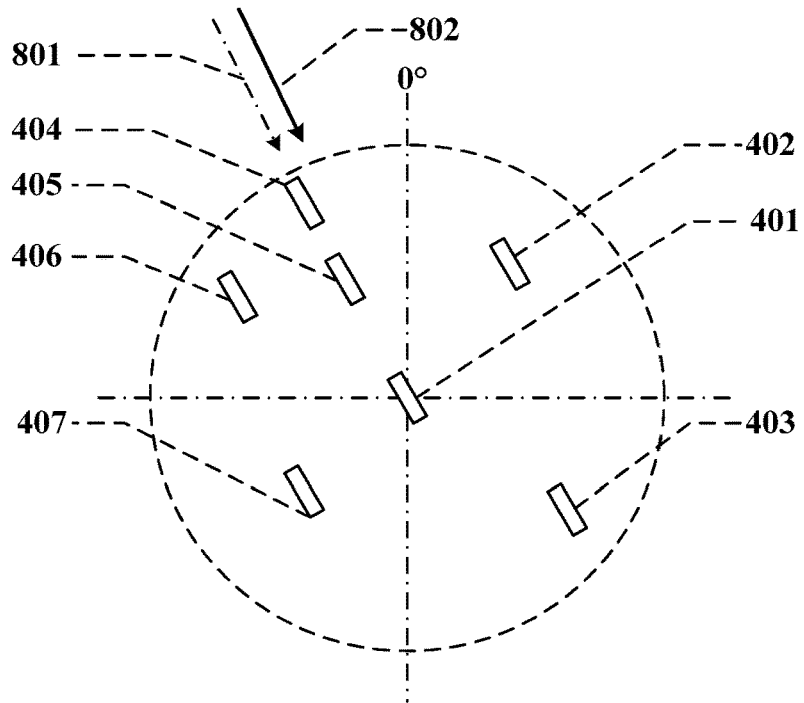
FIG. 11 is an exemplary schematic diagram of processing of step S1030 in FIG. 10.

FIG. 11 is an exemplary schematic diagram of processing of step S1030. The topological graph of the wind farm shown in the FIG. 5 is still taken as an example. Reference is made to FIG. 11, and it is assumed that a wind direction changes frequently or changes suddenly, and a wind turbine 401 determines that a wind turbine 405 has a maximum variation of wind speed, which changes from a wind speed 801 to a wind speed 802, based on the received wind condition data measured in a real-time manner from each wind turbine. In this case, the wind turbine 405 is selected as the second predetermined forward-direction wind turbine. When it is determined that the wind speed is greater than the cut-out wind speed of wind turbine, a distance between the wind turbine 405 and the wind turbine 401 is obtained based on the location data of the wind turbine 405, and an expected arrival time of a gale is acquired based on the wind speed value measured from wind turbine 405 and data of the distance. The wind turbine 401 makes preparations for performing over-speed protection on itself to ensure its safe operation, which facilitates extending its operation life.

On the other hand, if the current wind turbine is in a stopped state, then the current wind turbine is controlled to enter into a standby state, and process of the method returns to step S410 to continue to perform the operation control method for the wind turbine according to the present disclosure.

Figure 12:
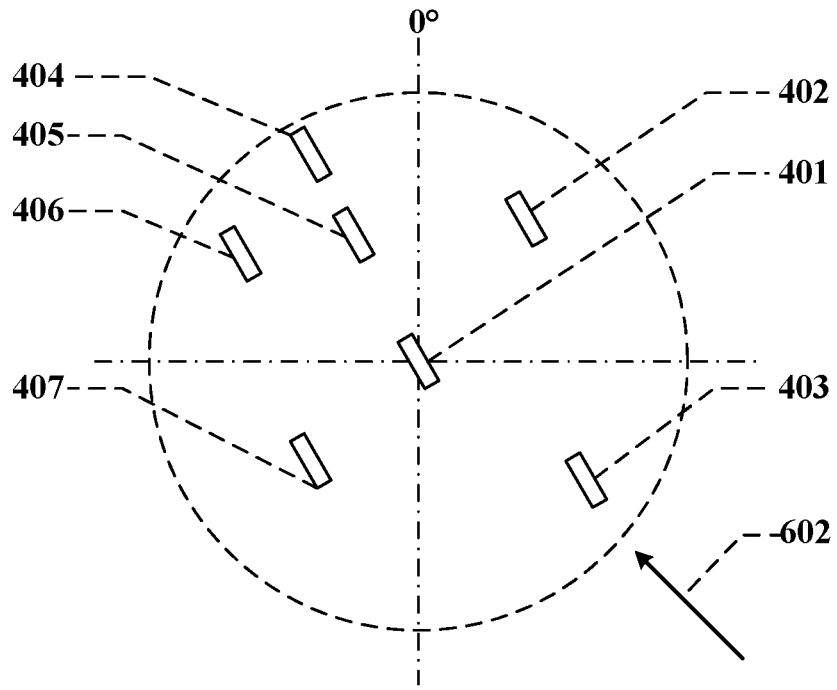
FIG. 12 is an exemplary schematic diagram of another processing of step S1030 in FIG. 10.

FIG. 12 is a schematic diagram of another exemplary processing of step S1030. The topological graph of the wind farm shown in the FIG. 5 is still taken as an example. Reference is made to FIG. 12, and it is assumed that a wind turbine 401 is in a stopped state, and the wind turbine 401 determines that a wind turbine 405 has a maximum variation of wind speed, which changes to a wind speed 602, based on the received wind condition data measured in a real-time manner from each wind turbine. In this case, the wind turbine 405 is selected as the second predetermined forward-direction wind turbine. After it is determined that the wind speed (for example, a wind speed higher than 5 m/s) changes to be higher than a start-up wind speed (for example, 3 m/s), the wind turbine 401 controls itself to enter into a standby state, step S410 is performed to achieve automatic yawing or achieve wind alignment in advance, and performing of the operation control method for the wind turbine according to the present disclosure is continued.

Fifth Embodiment

Figure 13:
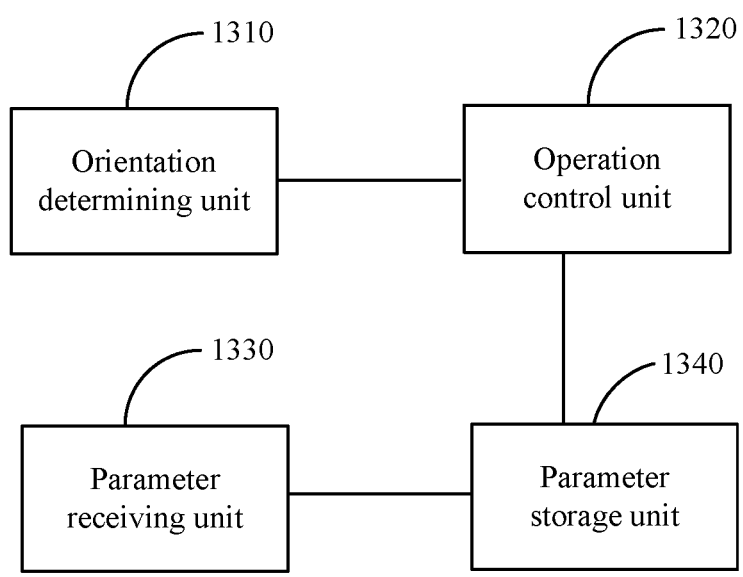
FIG. 13 is a logic block diagram of an operation control apparatus for a wind turbine according to a fifth embodiment of the present disclosure.

FIG. 13 is a logic block diagram of an operation control apparatus for a wind turbine according to the fifth embodiment of the present disclosure. The operation control apparatus may be provided in a main control system of the wind turbine, to perform the operation control method for the wind turbine according to the first embodiment.

Referring to FIG. 13, the operation control apparatus for the wind turbine according to the fifth embodiment includes an orientation determining unit 1310 and an operation control unit 1320.

The orientation determining unit 1310 is configured to acquire data of a current orientation of a nacelle of a current wind turbine.

The operation control unit 1320 is configured to control an operation device of the current wind turbine based on the data of the orientation, location data of each wind turbine in a wind farm, and wind condition data measured from the each wind turbine, to increase power generation amount of the current wind turbine.

Optionally, for the current wind turbine, the location data of each wind turbine in the wind farm is data of polar coordinates, with the current wind turbine as a pole and a ray in a predetermined angle from the pole as a polar axis.

Further, the operation control apparatus for the wind turbine further includes:

a parameter receiving unit 1330, configured to receive wind speed values and wind direction values measured from other wind turbines; and a parameter storage unit 1340, configured to store polar coordinates of each wind turbine in the wind farm in association with the wind speed value and the wind direction value measured from the each wind turbine.

Further, the parameter receiving unit 1330 is further configured to receive geographical location coordinates measured from other wind turbines. Correspondingly, the operation control apparatus for the wind turbine further includes: a polar coordinate calculation unit 1340, configured to calculate polar coordinates of other wind turbines based on a geographical location coordinate of the current wind turbine and the geographical location coordinates measured from the other wind turbines.

Further, the orientation determining unit 1310 is configured to acquire a yawing angle value read from a yawing counter of the current wind turbine, and acquire the data of the current orientation of the nacelle of the current wind turbine from the yawing angle value.

Sixth Embodiment

Figure 14:
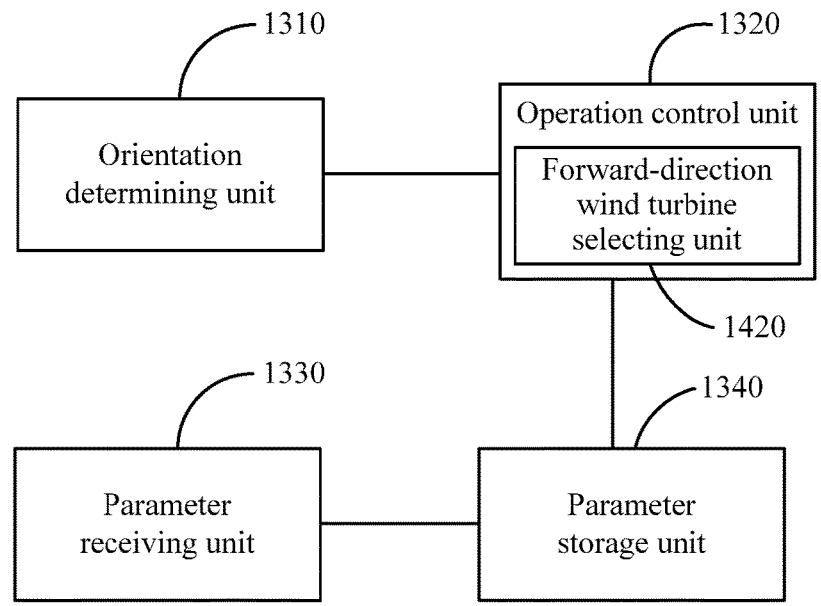
FIG. 14 is a logic block diagram of an operation control apparatus for a wind turbine according to a sixth embodiment of the present disclosure.

FIG. 14 is a logic block diagram of an operation control apparatus for a wind turbine according to the sixth embodiment of the present disclosure. The operation control apparatus for the wind turbine is a specific implementation of the operation control apparatus shown in the fifth embodiment.

Referring to FIG. 14, the operation control unit 1320 in the operation control apparatus for the wind turbine according to the sixth embodiment further includes: a forward-direction wind turbine selecting unit 1420, configured to select a wind turbine whose location is consistent with the current orientation as a current forward-direction wind turbine. Correspondingly, the operation control unit 1320 is configured to control the operation device of the wind turbine based on the location data of the forward-direction wind turbine, the wind speed value and/or the wind direction value measured from the forward-direction wind turbine and an operation state of the current wind turbine, to increase power generation amount of the current wind turbine.

The forward-direction wind turbine selecting unit 1420 is configured to select, from the location data of other wind turbines in the wind farm, location data whose polar angle has a difference, within a predetermined angle range, with respect to a polar angle of the current orientation of the nacelle of the current wind turbine, and determine a wind turbine corresponding to the selected location data as the forward-direction wind turbine.

Further, the forward-direction wind turbine selecting unit 1420 is further configured to: if the number of the wind turbine, corresponding to the location data whose polar angle has the difference, within the predetermined angle range, with respect to the polar angle of the current orientation of the nacelle of the current wind turbine, is more than one, select, from the more than one corresponding wind turbine, a wind turbine which has a minimum distance from the current wind turbine, as the forward-direction wind turbine.

Further, the parameter receiving unit 1330 is further configured to receive altitude values measured from the other wind turbines. The parameter storage unit 1340 is configured to store the polar coordinates of each wind turbine in the wind farm in association with an altitude value, the wind speed value and the wind direction value measured from the each wind turbine. Correspondingly, the forward-direction wind turbine selecting unit 1420 is configured to select, from the location data of the other wind turbines in the wind farm, a wind turbine which satisfies the following condition as the forward-direction wind turbine: its polar angle has a difference, within a predetermined angle difference range, with respect to the polar angle of the current orientation of the nacelle of the current wind turbine, and its altitude value has a difference, within a predetermined altitude difference range, with respect to the altitude value of the current wind turbine.

Further, the operation control unit 1320 is configured to: perform yawing control on the current wind turbine in advance based on the wind speed value and the wind direction value measured from the forward-direction wind turbine and a distance between the forward-direction wind turbine and the current wind turbine, if the current wind turbine is in a running state, and a wind direction difference between the wind direction value measured from the forward-direction wind turbine and a wind direction value previously measured from the forward-direction wind turbine is beyond a predetermined wind direction difference range.

Seventh Embodiment

Figure 15:
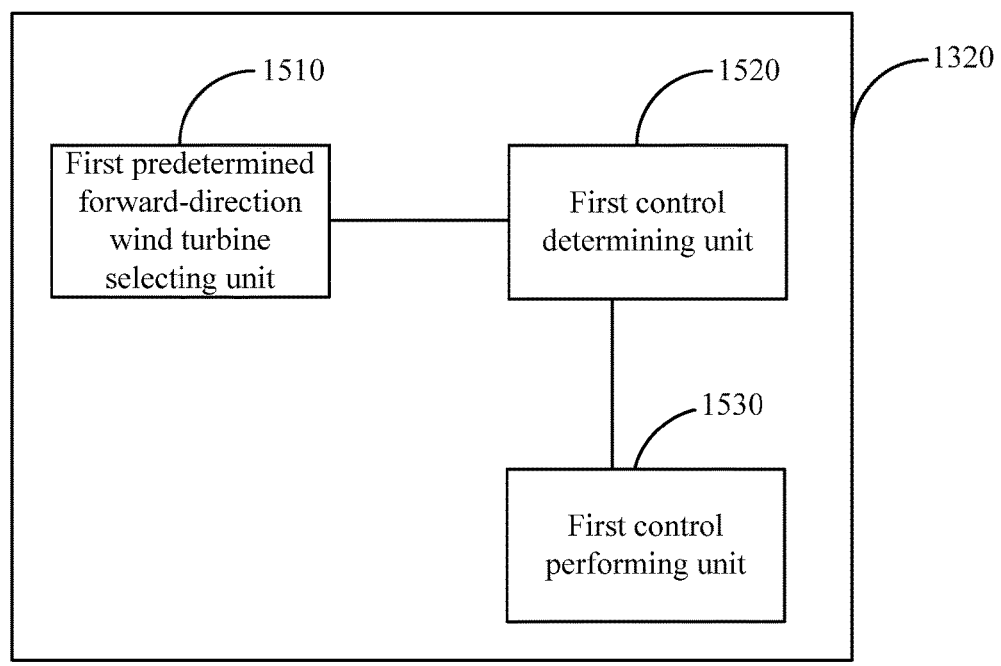
FIG. 15 is a logic block diagram of an operation control apparatus for a wind turbine according to a seventh embodiment of the present disclosure.

FIG. 15 is a logic block diagram of an operation control apparatus for a wind turbine according to a seventh embodiment of the present disclosure. The operation control apparatus for the wind turbine is a specific implementation of the operation control unit 1320 in the operation control apparatus shown in the sixth embodiment.

Referring to FIG. 15, the operation control unit 1320 includes a first predetermined forward-direction wind turbine selecting unit 1510, a first control determining unit 1520 and a first control performing unit 1530.

The first predetermined forward-direction wind turbine selecting unit 1510 is configured to select, from the other wind turbines, a wind turbine, which has a maximum variation of the measured wind direction value, as a current first predetermined forward-direction wind turbine.

The first control determining unit 1520 is configured to determine, based on changing states of wind conditions of the forward-direction wind turbine and the first predetermined forward-direction wind turbine, whether yawing control needs to be performed.

Specifically, the first control determining unit 1520 is configured to:

determine that yawing control needs to be performed, if the wind speed value measured from the first predetermined forward-direction wind turbine is greater than a predetermined first wind speed threshold, and a variation value of a wind direction measured from the first predetermined forward-direction wind turbine is greater than a predetermined threshold of wind direction variation; and determine that yawing control does not need to be performed, if the wind speed value measured from the first predetermined forward-direction wind turbine is not greater than the predetermined first wind speed threshold, or the variation value of the wind direction measured from the first predetermined forward-direction wind turbine is not greater than a first wind direction threshold.

The first control performing unit 1530 is configured to: perform yawing control on the current wind turbine in advance based on the wind speed value and the wind direction value measured from the first predetermined forward-direction wind turbine, if the first control determining unit 1520 determines that yawing control needs to be performed, to make the current wind turbine yaw to a wind direction detected by the first predetermined forward-direction wind turbine.

Specifically, the first control performing unit 1530 is configured to:

control the current wind turbine enter into a standby state and perform yawing in advance via the orientation determining unit 1310 and the operation control unit 1320, if the current wind turbine is in a stopped state; and perform yawing control on the current wind turbine in advance based on a distance between the first predetermined forward-direction wind turbine and the current wind turbine, and the wind speed value and the wind direction value measured from the first predetermined forward-direction wind turbine, if the current wind turbine is in a running state, to make the current wind turbine yaw to the wind direction detected by the first predetermined forward-direction wind turbine.

Eighth Embodiment

Figure 16:
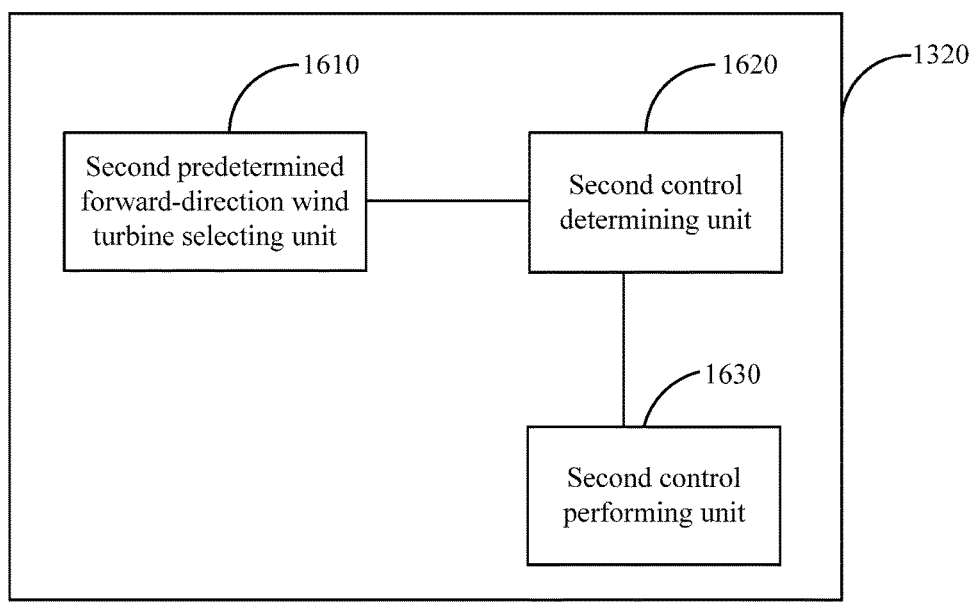
FIG. 16 is a logic block diagram of an operation control apparatus for a wind turbine according to an eighth embodiment of the present disclosure.

FIG. 16 is a logic block diagram of an operation control apparatus for a wind turbine according to the eighth embodiment of the present disclosure. The operation control apparatus for the wind turbine is another specific implementation of the operation control unit 1320 in the operation control apparatus shown in the sixth embodiment.

Referring to FIG. 16, the operation control unit 1320 includes a second predetermined forward-direction wind turbine selecting unit 1610, a second control determining unit 1620 and a second control performing unit 1630.

The second predetermined forward-direction wind turbine selecting unit 1610 is configured to select, from the other wind turbines, a wind turbine which has a maximum variation of the measured wind speed value, as a current second predetermined forward-direction wind turbine.

The second control determining unit 1620 is configured to determine, based on changing states of wind speeds of the forward-direction wind turbine and the first predetermined forward-direction wind turbine, whether yawing control needs to be performed.

Specifically, the second control determining unit 1620 is configured to:

determine that yawing control needs to be performed, if a variation value of the wind speed measured from the second predetermined forward-direction wind turbine is greater than a predetermined first wind speed variation threshold, and a variation value of the wind speed measured from the forward-direction wind turbine is greater than a predetermined second wind speed variation threshold; and determine that yawing control does not need to be performed, if the variation value of the wind speed measured from the second predetermined forward-direction wind turbine is not greater than the predetermined first wind speed threshold, or the variation value of the wind speed measured from the forward-direction wind turbine is not greater than the predetermined second wind speed variation threshold.

The second control performing unit 1630 is configured to: control the current wind turbine based on the wind condition data measured from the second predetermined forward-direction wind turbine, if the second control determining unit 1620 determines that control needs to be performed.

Further, the second control performing unit 1630 is configured to:

acquire an expected arrival time of a gale based on the location data of the second predetermined forward-direction wind turbine and the wind speed value measured from the second predetermined forward-direction wind turbine, to make preparations for performing over-speed protection control on the current wind turbine, if the wind speed value measured from the second predetermined forward-direction wind turbine reaches a predetermined to cut-out wind speed of wind turbine; and perform yawing control and pitch control on the current wind turbine in advance based on a distance between the second predetermined forward-direction wind turbine and the current wind turbine, and the wind speed value and the wind direction value measured from the second predetermined forward-direction wind turbine, to increase power generation amount of the current wind turbine, if the wind speed value measured from the second predetermined forward-direction wind turbine does not reach the predetermined cut-out wind speed of wind turbine.

Further, the second control performing unit 1630 is configured to: control the current wind turbine enter into a standby state, and perform yawing based on the distance between the second predetermined forward-direction wind turbine and the current wind turbine and the wind condition data measured from the second predetermined forward-direction wind turbine, if the current wind turbine is in a stopped state.

A wind turbine including the above operation control apparatus is further provided according to an embodiment of the present disclosure.

It should be noted that, based on requirements of implementations, each component/step described in the present disclosure may be divided into more components/steps, and two or multiple components/steps or parts of component/step may be combined to form a new component/step to achieve the object of the present disclosure.

The method according to the present disclosure may be implemented with hardware or firmware, or may be implemented with software or computer code that may be stored in record medium (such like CD ROM, RAM, floppy disk, hard disk or magneto-optical disk). Or, the method may be implemented with computer code originally stored in remote record medium or non-transient computer-readable medium, which can be downloaded via network and will be stored in local record medium. Hence, the method described herein may be processed by software stored in record medium applied to a general-purpose computer, a specific processor or programmable or special hardware (such as ASIC or FPGA). It can be understood that, a computer, a processor, a microprocessor controller or programmable hardware includes a memory module (such as RAM, ROM, flash memory) that can store or receive software or computer code, and the method described herein is implemented when the software or computer code is accessed and executed by a computer, a processor or hardware. Moreover, when a general-purpose computer accesses code for implementing the processing described herein, the general-purpose computer is switched to a special-purpose computer for executing the processing described herein as a result of executing the code.

The foregoing descriptions are merely embodiments of the invention, and the protection scope of the invention is not limited thereto. Variations or substitutions made by those skilled in the art without departing from the technical scope of the present disclosure shall fall within the protection scope of the invention. Therefore, the protection scope of the invention shall be defined by the appended claims.

The invention claimed is:

1. An operation control method for a wind turbine, comprising:

acquiring data of a current orientation of a nacelle of a current wind turbine; and controlling an operation device of the current wind turbine based on the data of the orientation, location data of each wind turbine in a wind farm and wind condition data measured from the each wind turbine, to increase power generation amount of the current wind turbine, wherein the step for controlling the operation device of the current wind turbine comprises:

selecting a wind turbine whose location is consistent with the current orientation as a forward-direction wind turbine, wherein the step for selecting the forward-direction wind turbine comprises:

selecting, from the location data of the other wind turbines in the wind farm, location data whose polar angle has such a difference with respect to a polar angle of the current orientation of the nacelle of the current wind turbine that is within a predetermined angle range; and determining a wind turbine corresponding to the selected location data as the forward-direction wind turbine; and controlling the operation device of the current wind turbine based on the location data of the forward-direction wind turbine, a wind speed value and/or a wind direction value measured from the forward-direction wind turbine and an operation state of the current wind turbine.

2. The method according to claim 1, wherein the selecting a wind turbine whose location is consistent with the current orientation as a forward-direction wind turbine further comprises:

selecting, from more than one wind turbines, a wind turbine which has a minimum distance from the current wind turbine as the forward-direction wind turbine, if the more than one wind turbines correspond to the location data whose polar angle has the difference with respect to the polar angle of the current orientation of the nacelle of the current wind turbine that is within the predetermined angle range.

3. The method according to claim 1, further comprising:
receiving altitude values measured from the other wind turbines, and storing polar coordinates of each wind turbine in the wind farm in association with an altitude value, a wind speed value and a wind direction value measured from the each wind turbine;
wherein selecting the wind turbine whose location is consistent with the current orientation as the forward-direction wind turbine based on the location data of the other wind turbines in the wind farm comprises:
selecting, from the location data of the other wind turbines hi the wind farm, a wind turbine which satisfies the following condition as the forward-direction wind turbine: its polar angle has a difference, within a predetermined angle difference range, with respect to the polar angle of the current orientation of the nacelle of the current wind turbine, and its altitude value has a difference, within a predetermined altitude difference range, with respect to the altitude value of the current wind turbine.

4. The method according to claim 1, wherein the controlling the operation device of the current wind turbine based on the location data of the forward-direction wind turbine, a wind speed value and/or a wind direction value measured from the forward-direction wind turbine and an operation state of the current wind turbine comprises:
performing yawing control on the current wind turbine autonomously based on the wind speed value and the wind direction value measured from the forward-direction wind turbine and a distance between the forward-direction wind turbine and the current wind turbine, when the current wind turbine is in a running state, and a wind direction difference between the wind direction value measured from the forward-direction wind turbine and a wind direction value previously measured from the forward-direction wind turbine is beyond a predetermined wind direction difference range.

5. The method according to claim 1, wherein the controlling the operation device of the current wind turbine based on the location data of the forward-direction wind turbine, a wind speed value and/or a wind direction value measured from the forward-direction wind turbine and an operation state of the current wind turbine comprises:
selecting, from the other wind turbines, a wind turbine which has a maximum variation of the measured wind direction value as a current first predetermined forward-direction wind turbine; and
determining, based on changing states of wind conditions of the forward-direction wind turbine and the first predetermined forward-direction wind turbine, whether yawing control needs to be performed, and performing yawing control on the current wind turbine in advance based on the wind speed value and the wind direction value measured from the first predetermined forward-direction wind turbine if it is determined that yawing control needs to be performed, to make the current wind turbine yaw to a wind direction detected by the first predetermined forward-direction wind turbine.

6. The method according to claim 5, wherein the determining, based on changing states of wind conditions of the forward-direction wind turbine and the first predetermined forward-direction wind turbine, whether yawing control needs to be performed comprises:
determining that yawing control needs to be performed, if the wind speed values measured from the forward-direction wind turbine and the first predetermined forward-direction wind turbine are both greater than a predetermined first wind speed threshold, and variation values of wind directions measured from the forward-direction wind turbine and the first predetermined forward-direction wind turbine are both greater than a predetermined threshold of wind direction variation.

7. The method according to claim 6, wherein performing yawing control on the current wind turbine in advance based on the wind speed value measured from the first predetermined forward-direction wind turbine comprises:
if the current wind turbine is in a stopped state, controlling the current wind turbine to enter into a standby state, and returning to perform the acquiring data of a current orientation of a nacelle of a current wind turbine, and the controlling an operation device of the current wind turbine based on the data of the orientation, location data of each wind turbine in a wind farm and wind condition data measured from the each wind turbine, to perform yawing control in advance; and
if the current wind turbine is in a running state, performing yawing control on the current wind turbine in advance based on a distance between the first predetermined forward-direction wind turbine and the current wind turbine, and the wind speed value and the wind direction value measured from the first predetermined forward-direction wind turbine, to make the current wind turbine yaw to the wind direction detected by the first predetermined forward-direction wind turbine.

8. The method according to claim 1, wherein the controlling the operation device of the current wind turbine based on the location data of the forward-direction wind turbine, the wind speed value and/or the wind direction value measured from the forward-direction wind turbine and an operation state of the current wind turbine comprises:
selecting, from the other wind turbines, a wind turbine which has a maximum variation of the measured wind speed value as a current second predetermined forward-direction wind turbine; and
determining, based on changing states of wind speeds of the forward-direction wind turbine and the second predetermined forward-direction wind turbine, whether control needs to be performed, and if it is determined that control needs to be performed, performing control on the current wind turbine based on the wind condition data measured from the second predetermined forward-direction wind turbine.

9. The method according to claim 8, wherein the determining, based on changing states of wind speeds of the forward-direction wind turbine and the second predetermined forward-direction wind turbine, whether control needs to be performed comprises:
determining that control needs to be performed, if a variation value of the wind speed measured from the second predetermined forward-direction wind turbine is greater than a predetermined first wind speed variation threshold, and a variation value of the wind speed measured from the forward-direction wind turbine is greater than a predetermined second wind speed variation threshold; and determining that control does not need to be performed, if the variation value of the wind speed measured from the second predetermined forward-direction wind turbine is not greater than the first wind speed variation threshold, or the variation value the wind speed measured from the forward-direction wind turbine is not greater than the second wind speed variation threshold.

10. The method according to claim 8, wherein the performing control on the current wind turbine based on the wind condition data measured from the second predetermined forward-direction wind turbine comprises:

making preparations for performing over-speed protection control on the current wind turbine based on the location data of the second predetermined forward-direction wind turbine and the wind speed value measured from the second predetermined forward-direction wind turbine, if the wind speed value measured from the second predetermined forward-direction wind turbine reaches a predetermined cut-out wind speed of wind turbine; and performing yawing control and pitch control on the current wind turbine in advance based on a distance between the second predetermined forward-direction wind turbine and the current wind turbine, the wind speed value and the wind direction value measured from the second predetermined forward-direction wind turbine, if the wind speed value measured from the second predetermined forward-direction wind turbine does not reach the predetermined cut-out wind speed of wind turbine.

11. The method according to claim 8, wherein the performing control on the current wind turbine based on the wind condition data measured from the second predetermined forward-direction wind turbine comprises:

controlling the current wind turbine to enter into a standby state and performing yawing based on a distance between the second predetermined forward-direction wind turbine and the current wind turbine and the wind condition data measured from the second predetermined forward-direction wind, if the current wind turbine is in a stopped state.

12. An operation control apparatus for a wind turbine, comprising:

an orientation determining unit, configured to acquire data of a current orientation of a nacelle of a current wind turbine; and an operation control unit, configured to control an operation device of the current wind turbine based on the data of the orientation, location data of each wind turbine in a wind farm, and wind condition data measured from the each wind turbine, to increase power generation amount of the current wind turbine, wherein the operation control unit comprises:

a forward-direction wind turbine selecting unit, configured to select a wind turbine whose location is consistent with the current orientation as a current forward-direction wind turbine; and the operation control unit is configured to control the operation device of the current wind turbine based on the location data of the forward-direction wind turbine, a wind speed value and/or a wind direction value measured from the forward-direction wind turbine and an operation state of the current wind turbine, wherein the for forward-direction wind turbine selecting unit is configured to:

select, from the location data of the other wind turbines in the wind farm, location data whose polar angle has such a difference with respect to a polar angle of the current orientation of the nacelle of the current wind turbine that is within a predetermined angle range; and determine a wind turbine corresponding to the selected location data as the forward-direction wind turbine.

13. The apparatus according to claim 12, wherein the forward-direction wind turbine selecting unit is configured to select, from more than one wind turbines, a wind turbine which has a minimum distance from the current wind turbine as the forward-direction wind turbine, if the more than one wind turbines correspond to the location data whose polar angle has the difference with respect to the polar angle of the current orientation of the nacelle of the current wind turbine that is within the predetermined angle range.

14. The apparatus according to claim 12, further comprising: a parameter receiving unit configured to receive altitude values measured from the other wind turbines, and a parameter storage unit configured to store polar coordinates of each wind turbine in the wind farm in association with an altitude value, a wind speed value and a wind direction value measured from the each wind turbine; wherein the forward-direction wind turbine selecting unit is configured to select, from the location data of the other wind turbines in the wind farm, a wind turbine which satisfies the following condition as the forward-direction wind turbine:

its polar angle has a difference, within a predetermined angle difference range, with respect to the polar angle of the current orientation of the nacelle of the current wind turbine, and its altitude value has a difference, within a predetermined altitude difference range, with respect to the altitude value of the current wind turbine.

15. The apparatus according to claim 12, wherein the operation control unit is configured to:

perform yawing control on the current wind turbine autonomously based on the wind speed value and the wind direction value measured from the forward-direction wind turbine and a distance between the forward-direction wind turbine and the current wind turbine, when the current wind turbine is in a running state, and a wind direction difference between the wind direction value measured from the forward-direction wind turbine and a wind direction value previously measured from the forward-direction wind turbine is beyond a predetermined wind direction difference range.

16. The apparatus according to claim 12, wherein the operation control unit comprises:

a first predetermined forward-direction wind turbine selecting unit, configured to select, from the other wind turbines, a wind turbine which has a maximum variation of the measured wind direction value, as a current first predetermined forward-direction wind turbine;

a first control determining unit, configured to determine, based on changing states of wind conditions of the forward-direction wind turbine and the first predetermined forward-direction wind turbine, whether yawing control needs to be performed; and a first control performing unit, configured to perform yawing control on the current wind turbine in advance based on the wind speed value and the wind direction value measured from the first predetermined forward-direction wind turbine if the first control determining unit determines that yawing control needs to be performed, to make the current wind turbine yaw to a wind direction detected by the first predetermined forward-direction wind turbine.

17. The apparatus according to claim 12, wherein the operation control unit comprises:
- a second predetermined forward-direction wind turbine selecting unit, configured to select, from the other wind turbines, a wind turbine which has a maximum variation of the measured wind speed value as a current second predetermined forward-direction wind turbine;
- a second control determining unit, configured to determine, based on changing states of wind speeds of the forward-direction wind turbine and the second predetermined forward-direction wind turbine, whether yawing control needs to be performed; and
- a second control performing unit, configured to control the current wind turbine based on the wind condition data measured from the second predetermined forward-direction wind turbine, if the second control determining unit determines that control needs to be performed.

* * * * *